United States Patent

Hovey et al.

[11] 3,976,526
[45] Aug. 24, 1976

[54] PREPARATION OF CURVED COMPOSITE PANEL CONTAINING A RIGID FOAMED PLASTIC

[75] Inventors: William P. Hovey, Mount Pleasant; James J. Kubiak, Midland, both of Mich.

[73] Assignee: The Dow Chemical Company, Midland, Mich.

[22] Filed: Sept. 16, 1974

[21] Appl. No.: 506,363

[52] U.S. Cl. ............................... 156/212; 156/163; 156/199
[51] Int. Cl.² ......................................... B29C 17/04
[58] Field of Search ........... 156/494, 212, 229, 163, 156/164, 160, 199, 196, 77; 264/285, 288, 321; 144/255, 282; 52/80, 223 R; 29/446

[56] References Cited
UNITED STATES PATENTS

| | | | |
|---|---|---|---|
| 3,012,923 | 12/1961 | Slatter | 156/196 X |
| 3,300,839 | 1/1967 | Lichti | 29/446 D X |
| 3,389,202 | 6/1968 | Waling | 264/321 X |
| 3,531,348 | 9/1970 | Kunevicius | 156/229 |
| 3,616,123 | 10/1971 | Reynolds et al. | 156/199 X |

FOREIGN PATENTS OR APPLICATIONS

| 563,097 | 7/1944 | United Kingdom | 144/255 |
|---|---|---|---|

*Primary Examiner*—David A. Simmons
*Attorney, Agent, or Firm*—Robert B. Ingraham

[57] ABSTRACT

A curved panel is prepared by bending a rigid plastic foam such as polystyrene foam and simultaneously applying a rigid facing layer on the convex surface thereof.

2 Claims, 1 Drawing Figure

U.S. Patent   Aug. 24, 1976   3,976,526
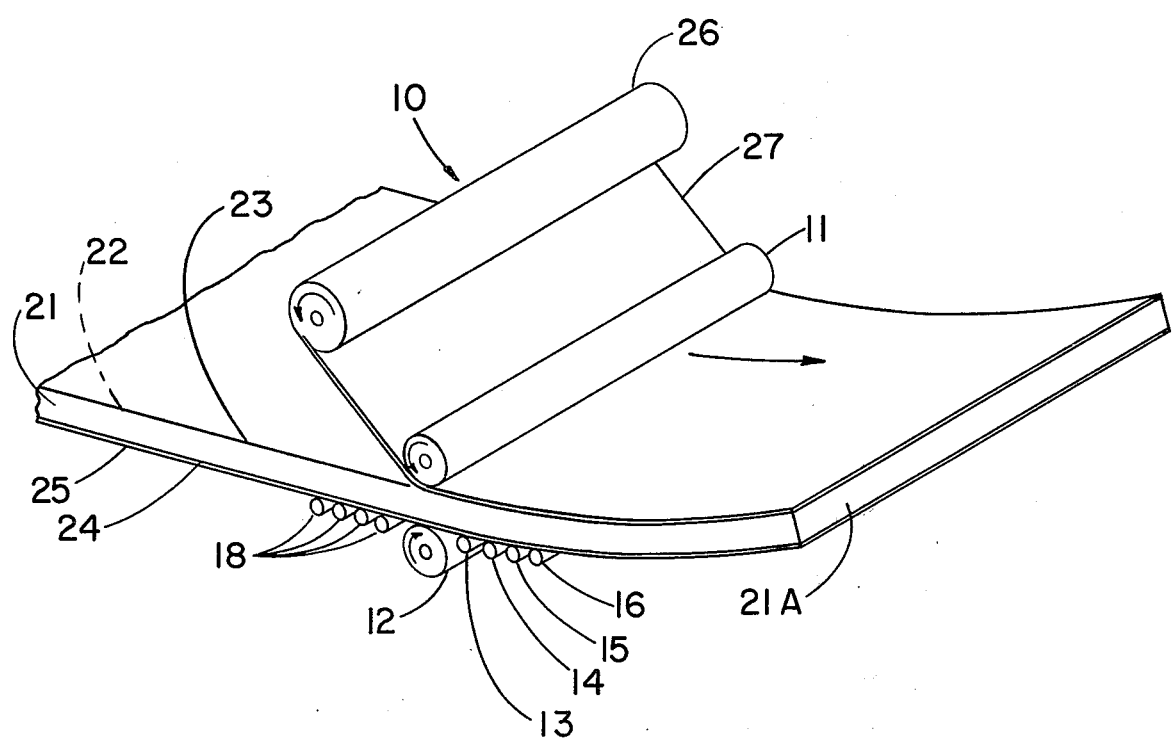

PREPARATION OF CURVED COMPOSITE PANEL CONTAINING A RIGID FOAMED PLASTIC

Composite panels are used extensively in building and vehicle construction. Generally such panels comprise a core of a rigid foamed plastic and have a rigid facing sheet affixed to at least one face and for many applications affixed to the two major surfaces of the sheet. Flat or planar panels are readily and conventionally prepared by laminating a face sheet to an appropriate foam core generally by the use of adhesives. However, for many applications it is desired that such composite panels have a curved configuration. Generally such curved panels are prepared by laminating the appropriate face sheets to the foamed core while the curved panel and face sheets are held in a mold or form. In many instances it is desirable to employ so-called contact adhesives for the preparation of composite panels. Such contact adhesives generally are a rubber or highly viscous substance dissolved or dispersed in liquid. The liquid is then applied to one or both of the surfaces to be joined, the liquid subsequently removed by evaporation and the treated surfaces are placed in contact with each other which results in essentially an instant bond between the treated members. Such adhesives are highly desirable in that a joint of adequate strength can be obtained in a very short period of time. By the term "rigid foam" is meant a foam which will rupture when a piece of foam measuring 12 × 1 × 1 inches is bent about a mandrel having a diameter of 6 inches.

It would be desirable if there were available a method for the preparation of curved plastic foam-containing panels.

It would also be desirable if there were available a method for the preparation of curved composite plastic foam-containing panels wherein the curvature could be varied.

It would also be desirable if there were available an improved method for the preparation of curved composite foam-containing panels which required minimal equipment and rapid processing.

These benefits and other advantages in accordance with the present invention are achieved in a method for the preparation of a curved composite foam-containing panel, the steps of the method comprising providing a foam plastic body having at least a first generally planar surface and a second generally planar surface, the first and second surfaces being generally parallel, bending the body to provide a body having a generally concave configuration to the first major surface, applying to the body and adhering to the body a facing sheet, the facing sheet being applied to the body at a location along a line where the body is being bent.

The process of the present invention may be employed with any rigid cellular plastic foam which is capable of being bent to the desired degree without rupture. Typical foams which are suitable include polystyrene foam; rigid polyurethane foam, polyvinyl chloride foam, polyamides such as are prepared from nylon and the like.

A wide variety of facing sheets may be employed for the practice of the present invention. Such facing sheets include metal, aluminum, steel, stainless steel, copper, zinc, wood veneer, plywood, chipboard, fiber board, plastics such as polystyrene, polyvinyl chloride, polyethylene, polypropylene and the like.

A wide variety of adhesives may be employed in the present invention. Particularly suitable are adhesives generally referred to as contact adhesives. As various materials, particularly plastic foams, differ in their sensitivity to solvents employed in the formulation of such adhesives, the foam manufacturer's adhesive recommendations usually should be followed.

Alternately, settable adhesives, such as hardenable polyurethane compositions, may also be employed, as well as phenol formaldehyde adhesives, epoxy resin compositions and similar thermosetting materials. An adhesive is selected which does not destroy or attack the foam.

The process of the present invention may be more readily understood by reference to the FIGURE wherein there is schematically depicted a bending apparatus generally designated by the reference numeral 10. the apparatus 10 comprises in cooperative combination a first roll 11 and a second roll 12. The rolls 11 and 12 are disposed in parallel spaced apart relationship and rotate in the direction indicated by the arrows. Generally adjacent the roll 12 and remote from the roll 11 is a third roll 13 which is also parallel to the rolls 11 and 12 and whose axis is selectively positionable relative to the axis of the rolls 11 and 12. Optionally and desirably, rolls 14, 15 and 16 are disposed in a generally arcuate fashion adjacent the roll 13 and remote from the roll 12. Beneficially, the rolls 14, 15 and 16 are selectively positionable as is the roll 13. The axis of the rolls 14, 15 and 16 are also parallel to the axis of the rolls 11 and 12. A plurality of feed rolls 18 are disposed adjacent the roll 12 remote from the roll 11 and remote from the roll 13. The rolls 18 are selectively positionable and desirably have their axes intercepting an arc which passes through the axes of the rolls 13, 14, 15 and 16. Depending on the particular laminate to be prepared, the diameter of the rolls, surface and the like, the rolls 11 or 12 may be driven, or the rolls 11 and 12 may be driven, or all of the rolls may be driven if desired. For most applications it is generally sufficient if the rolls 11 and 12 are driven and the rolls 13, 14, 15, 16 and 18 are employed as idler rolls. As depicted in the FIGURE, a foam laminate 21 is being fed into the rolls in the direction indicated by the straight arrow. The laminate 21 comprises a foam plastic core 22. The core 22 has a first major face 23 and a second major face 24. A rigid facing sheet 25 is adhered to the second major surface 24 of the core 22. A skin supply means 26 is disposed generally adjacent the roll 11 and adjacent the first face 23 of the laminate 21. The facing sheet supply means 26 provides a facing sheet 27 beneficially having an adhesive on the surface thereof adjacent to the surface 23. The laminate 21 and the facing sheet 27 are passed between the rolls 11 and 12 and the facing sheet 27 is firmly pressed against the face 23 to form a laminate 21a which is bent when in contact with the roll 13. The bending of the laminate 21 and the face 27 occurs in a generally linear location lying between the rolls 11 and 12. The facing sheet 27 contacts and adheres to the laminate 21 at a location where the face 23 assumes a concave configuration and results in the laminate 21a having a curvature which closely approximates the curvature expected from the roll configuration 11, 12 and 13. By adjustably mounting the rolls 13, 14, 15 and 16, laminates of varying curvature are readily produced; for example, a U-shaped laminate having straight legs, relatively short radius curves at the ends of the legs and a gently curving section lying therebetween.

By way of further illustration, a plurality of laminates are prepared employing an aluminum facing sheet 0.24 inch in thickness, polystyrene foam 1.5 inches thick and having a density of about 2.2 pounds per cubic foot and 5/32 inch nominal thickness hardwood plywood. In all cases, the outer or convex skin is first adhered to the foam and contact adhesive applied to both the inner or side to be concave of the foam and the facing sheet to be added. Aluminum/foam/aluminum laminates are prepared having a radius of curvature as low as 18 inches. A plywood/foam/aluminum laminate is prepared having the plywood on the concave surface wherein the radius of curvature is about 20 feet. In all cases, the skin on the concave side is separated from the foam core until initial contact at a location between the nip rolls. In a manner similar to the foregoing illustration, a wide variety of curved laminates is readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a curved composite laminated plastic foam-containing panel, the steps of the method comprising providing a rigid foam plastic body having at least a first generally planar major surface and a second generally planar major surface, the second surface having a first facing sheet adhered thereto, the first and second surfaces being generally parallel, bending the body to provide a body having a generally concave configuration of the first major surface, applying to the first major surface of the body and adhering to the body a second facing sheet, the second facing sheet being applied and adhered to the body at a location along a line where the body is bent.

2. The method of claim 1 wherein bending is accomplished by passing the body between spaced apart generally parallel rolls.

* * * * *

UNITED STATES PATENT AND TRADEMARK OFFICE
CERTIFICATE OF CORRECTION

PATENT NO. : 3,976,526
DATED : August 24, 1976
INVENTOR(S) : William P. Hovey, James J. Kubiak It is certified that error appears in the above-identified patent and that said Letters Patent are hereby corrected as shown below:

On the title page, under "References Cited", delete "Slatter" and insert -- Slayter --.

Column 2, line 18, delete "the" and insert -- The --.

Column 4, line 22, insert --being-- before the word "bent".

Signed and Sealed this

First Day of February 1977

[SEAL]

Attest:

RUTH C. MASON
*Attesting Officer*

C. MARSHALL DANN
*Commissioner of Patents and Trademarks*